United States Patent [19]

Ikuzawa et al.

[11] Patent Number: 5,512,944
[45] Date of Patent: Apr. 30, 1996

[54] PHASE SHIFTING DEVICE FOR VECTORSCOPE

[75] Inventors: Kenzo Ikuzawa; Yoshimichi Hika, both of Kanagawa, Japan

[73] Assignee: Leader Electronics Corporation, Kanagawa, Japan

[21] Appl. No.: 443,191

[22] Filed: May 17, 1995

[30] Foreign Application Priority Data

May 17, 1994 [JP] Japan .................... 6-102934

[51] Int. Cl.⁶ ................................ H04N 17/02
[52] U.S. Cl. .......................... 348/186; 348/180
[58] Field of Search ...................... 348/180, 184, 348/186, 194; 329/88

[56] References Cited

U.S. PATENT DOCUMENTS

| | | | |
|---|---|---|---|
| 4,648,113 | 3/1987 | Horn et al. ............... | 348/186 X |
| 4,875,089 | 10/1989 | Judge ...................... | 348/186 |
| 5,038,048 | 8/1992 | Birkel et al. ............. | 348/186 X |
| 5,172,224 | 12/1992 | Baker ...................... | 348/186 |
| 5,175,614 | 12/1992 | Proebstel . | |

*Primary Examiner*—Victor R. Kostak
*Assistant Examiner*—Nathan J. Flynn
*Attorney, Agent, or Firm*—Fish & Richardson

[57] ABSTRACT

A phase shifting device for a vectorscope is provided which enables a vector-displayed waveform to be instantaneously and accurately rotated to an arbitrary or variable predetermined target phase position, with an arbitrary or variable predetermined portion of the vector-displayed waveform being selected as a reference for phase shifting. The phase shifting device includes first and second phase shift input generators. The first generator produces a first phase shift input signal representative of an arbitrary amount of phase shifting. The second generator produces a second phase shift input signal representative of a predetermined amount of phase shifting for the instantaneous and accurate rotation of the vector-displayed waveform.

11 Claims, 6 Drawing Sheets

PHASE SHIFTING DEVICE FOR VECTORSCOPE

BACKGROUND OF THE INVENTION

1. Field of the Invention

The present invention relates to a phase shifting device for manipulating vector-displayed waveforms in a phase advancing or retarding direction, i.e., a direction of rotation on a vectorscope, and more particularly to a phase shifting device for a vectorscope which is used to manipulate an entire vector-displayed waveform such that a particular desired portion of the vector-displayed waveform is located at a predetermined target phase (or angular) position on vector display coordinates or on a vector display graticule.

2. Description of the Prior Art

Conventional vectorscopes are provided with a phase shifter which shifts in phase a subcarrier regenerated from a color video signal in order to rotate an entire vector-displayed waveform on vector display coordinates. It should be noted that in the vector display coordinate, the angle and magnitude of each vector in the vector display coordinates represent hue and saturation, respectively. The phase shifter is responsive to a manual operation of a phase shift knob on a control panel to successively shift in phase the regenerated subcarrier by any desired amount in open loop control such that the vector-displayed waveform is rotated from the currently displayed phase position.

Japanese Patent Appln. Public-Disclosure No. 5-122734 (1993) discloses a vectorscope automatic burst positioning circuit which shifts in phase, in response to operation of an auto burst position button, a vector-displayed waveform from a currently displayed phase position to a target phase position substantially successively by an unspecified amount corresponding to the difference between the currently displayed and target phase positions. For this purpose, the automatic burst positioning circuit generates in closed loop control a phase shift control signal which is inputted to a phase shifter for phase-shifting of a regenerated subcarrier. More specifically, predetermined conditions are defined for representing that a particular portion of a vector-displayed waveform, i.e., a burst vector has reached a target or reference phase position (at 180° position in the NTSC standard), and the phase shift control signal is incremented until the conditions are satisfied. The predetermined conditions may be defined with respect to the values of R-Y and B-Y signals which are chrominance components sampled during a burst interval.

The phase shifting methods employed in the conventional vectorscopes give rise to problems when an operator attempts to rapidly and accurately rotate a vector-displayed waveform in order to move any predetermined portion of the vector-displayed waveform to any target phase position. Specifically, the above-mentioned first method using the phase shift knob requires a certain amount of time since phase shifting must be performed by progressively rotating a displayed waveform. The method also requires the operator to visually confirm whether a predetermined waveform portion, which is a reference for phase shifting, accurately matches with a predetermined target phase position. If the matching is not accurate, fine adjustments must be carried out. Thus, the method is problematic in that a rapid and accurate phase shift operation cannot be performed easily.

The second phase shifting method using the automatic burst positioning circuit suffers from restraints due to the circuit configuration. Specifically, a waveform portion to be selected as a phase shifting reference and a target phase position cannot be arbitrarily selected or changed, and a particular portion of a vector-displayed waveform, i.e., a burst vector portion is only regarded as a phase shift reference, and a target phase position is fixed to the standard phase position of the burst vector. The positioning circuit is provided with a sample and hold circuit for sampling and holding R-Y and B-Y values during a burst interval and a zero adjust circuit for determining conditions which are satisfied by the R-Y and B-Y values when a burst vector signal is shifted to the standard burst phase position. Further, the closed-loop operation of the auto burst positioning circuit, although achieving accurate phase shifting, is very slow because determination is made as to whether a burst signal vector has reached the standard phase position each time a phase shift is incremented (or decremented).

SUMMARY OF THE INVENTION

It is therefore an object of the present invention to provide a phase shifting device for a vectorscope which is capable of rapidly or substantially instantaneously and accurately rotating a vector-displayed waveform to an arbitrary or variable predetermined target phase position with an arbitrary or variable predetermined portion of the waveform being selected as a reference for phase shifting.

It is another object of the present invention to provide a phase shifting device for a vectorscope which is capable of carrying out the above-mentioned phase shifting with a simple configuration.

It is a further object of the present invention to provide a vectorscope which incorporates the above-mentioned phase shifting device.

To achieve the above objects, the present invention provides a phase shifting device for a vectorscope with a generator for producing a predetermined phase shift input.

In particular, the phase shifting device according to the present invention comprises: a) phase shifting means having an input for receiving said regenerated subcarrier, an input for receiving a phase shift output signal, and an output for providing said regenerated subcarrier having a phase shifted by an amount represented by said phase shift output signal; b) first phase shift input generator means for producing a first phase shift input signal representative of an arbitrary amount of phase shifting; c) second phase shift input generator means for producing a second phase shift input signal representative of a predetermined amount of phase shifting; d) phase shift input selection command means for producing an input selection command signal for selecting one of said first and second phase shift input signals; and e) phase shift output generator means connected to said first and second phase shift input generator means and to said phase shift input selection command means for selecting one of said first and second phase shift input signals in response to said input selection command signal and for providing the selected one as said phase shift output signal.

According to the present invention, said second phase shift input generator means includes: a) storage command means for producing a storage command signal; and b) storing means for storing said phase shift output signal as said second phase shift input signal in response to said storage command signal. Also, said first phase shift input generator means includes: a) displacement input means for providing a phase shift displacement; and b) changing means connected to said displacement input means and to said phase shift output generator means for combining said phase shift output signal with said phase shift displacement to generate said first phase shift input signal.

Also, a vectorscope according to the present invention comprises: A. an input terminal for receiving a color video signal; B. a subcarrier regenerator having an input connected to said input terminal and an output for providing a regenerated subcarrier; C. a phase shifting device having an input coupled to the output of said subcarrier regenerator, said device being operative to shift in phase said regenerated subcarrier by a specified amount, said phase shifting device including: a) phase shifting means having an input for receiving said regenerated subcarrier, an input for receiving a phase shift output signal, and an output for providing said regenerated subcarrier having a phase shifted by an amount represented by said phase shift output signal; b) first phase shift input generator means for producing a first phase shift input signal representative of an arbitrary amount of phase shifting; c) second phase shift input generator means for producing a second phase shift input signal representative of a predetermined amount of phase shifting; d) phase shift input selection command means for producing an input selection command signal for selecting one of said first and second phase shift input signals; and e) phase shift output generator means connected to said first and second phase shift input generator means and to said phase shift input selection command means for selecting one of said first and second phase shift input signals in response to said input selection command signal and for providing the selected one as said phase shift output signal; D. a demodulator circuit having a first input connected to said input terminal and a second input connected to an output of said phase shifting device, said demodulator circuit being operative to produce R-Y and B-Y signals; and E. a display coupled to receive said R-Y and B-Y signals.

BRIEF DESCRIPTION OF THE DRAWINGS

The present invention will hereinafter be described in detail in connection with preferred embodiments thereof with reference to the accompanying drawings.

DESCRIPTION OF THE PREFERRED EMBODIMENTS

Figure 1:
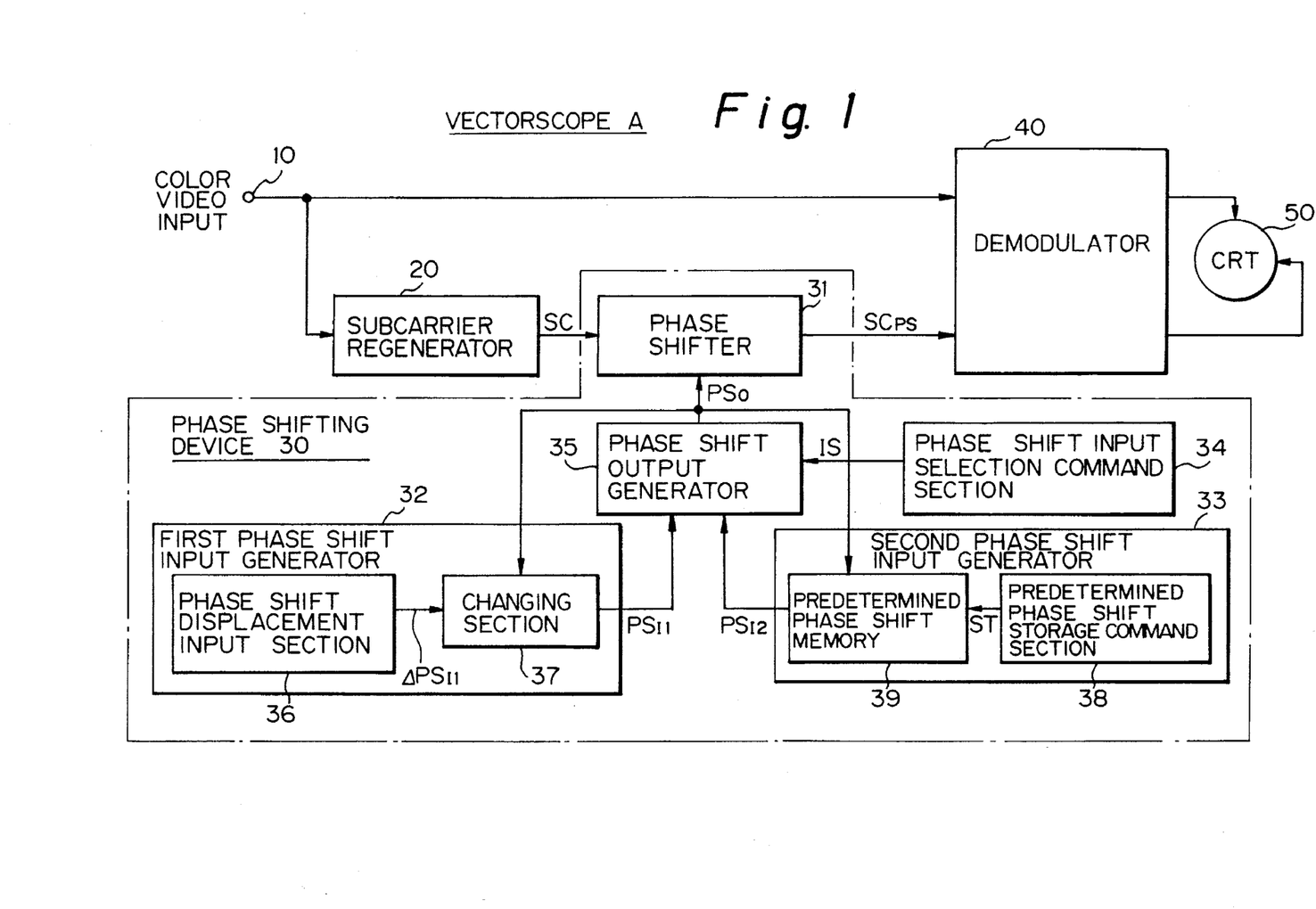
FIG. 1 is a functional block diagram showing the basic configuration of a vectorscope provided with a phase shifting device according to the present invention.

FIG. 1 is a functional block diagram showing the basic configuration of a vectorscope which is provided with a phase shifting device according to the present invention. As illustrated, the vectorscope A comprises an input terminal 10 to which a color video signal is applied. The vectorscope A also includes a subcarrier regenerator 20, a phase shifting device 30, a demodulator circuit 40, and a cathode ray tube (CRT) 50. The input terminal 10 is connected to an input of the regenerator 20 which has an output for providing a regenerated subcarrier SC. The output of the regenerator 20 is connected to an input of the phase shifting device 30 which has an output for providing a phase-shifted version of the regenerated subcarrier $SC_{PS}$. The input terminal 10 is connected to a first input of the demodulator circuit 40 which has a second input connected to the output of the device 30. The demodulator 40 produces R-Y and B-Y signals which are coupled to vertical and horizontal axis circuit inputs, respectively, of the CRT 50.

The phase shifting device 30 includes a phase shifter 31 which has an input for receiving the regenerated subcarrier SC, another input for receiving a phase shift output signal $PS_O$, and an output for producing the phase-shifted regenerated subcarrier $SC_{PS}$ which is shifted in phase by an amount represented by the output signal $PS_O$. The device 30 also includes first and second phase shift input generators 32 and 33, a phase shift input selection command section 34 and a phase shift output generator 35. The first input generator 32 generates a first phase shift input signal $PS_{I1}$ representing an arbitrary amount of phase shifting, while the second input generator 33 generates a second phase shift input signal $PS_{I2}$ representing a predetermined amount of phase shifting. The section 34 generates an input selection command signal IS for selecting one of the two phase shift input signals $PS_{I1}$ and $PS_{I2}$. The output generator 35 is connected to the first and second input generators 32 and 33 and the selection command section 34 such that one of the two phase shift input signals $PS_{I1}$ and $PS_{I2}$ is selected in response to the selection command signal IS and outputted to the phase shifter 31 as the phase shift output signal $PS_O$.

In the vectorscope A configured as described above, the phase shifter 31 has two phase shift modes of operation: a first mode for providing a phase shift the absolute value of which is arbitrary, and a second mode for providing a phase shift the absolute value of which is equal to a predetermined value. With the provision of the two modes, the use of the second mode of operation enables an entire vector-displayed waveform to be instantaneously moved to a particular rotational (or angular) position whichever location a current rotational position of the waveform is located. Also, since the magnitude of the phase shift is simply represented by a predetermined value, any portion of a vector-displayed waveform can be selected as a reference for phase shifting, and any phase position on the vector-display coordinates may be selected as a target phase position.

The first input generator 32 may be composed of a displacement input section 36 for inputting a phase shift displacement $\Delta PS_{I1}$, which may be a conventional phase shift knob as mentioned above, and a changing section 37. Then, the changing section 37 is connected to the displacement input section 36 and the phase shift output generator 35 such that the phase shift output signal $PS_O$ is combined with the displacement $\Delta PS_{I1}$ to generate the first phase shift input signal $PS_{I1}$. The second input generator 33 may be composed of a storage command section 38 for generating a storage command signal ST and a memory 39. Then, the memory 39 is responsive to the storage command signal ST to store the phase shift output signal $PS_O$ as the second phase shift input signal $PS_{I2}$.

With the configuration described above, a predetermined phase shift used in the second phase shift mode of operation can be set to an absolute value of the current amount of phase shifting, enabling a waveform portion used as a phase shifting reference and a target phase position to be easily changed.

Now referring to FIGS. 2–6, a vectorscope B which is a more specific embodiment of the vectorscope A will be described hereinafter.

Figure 2:
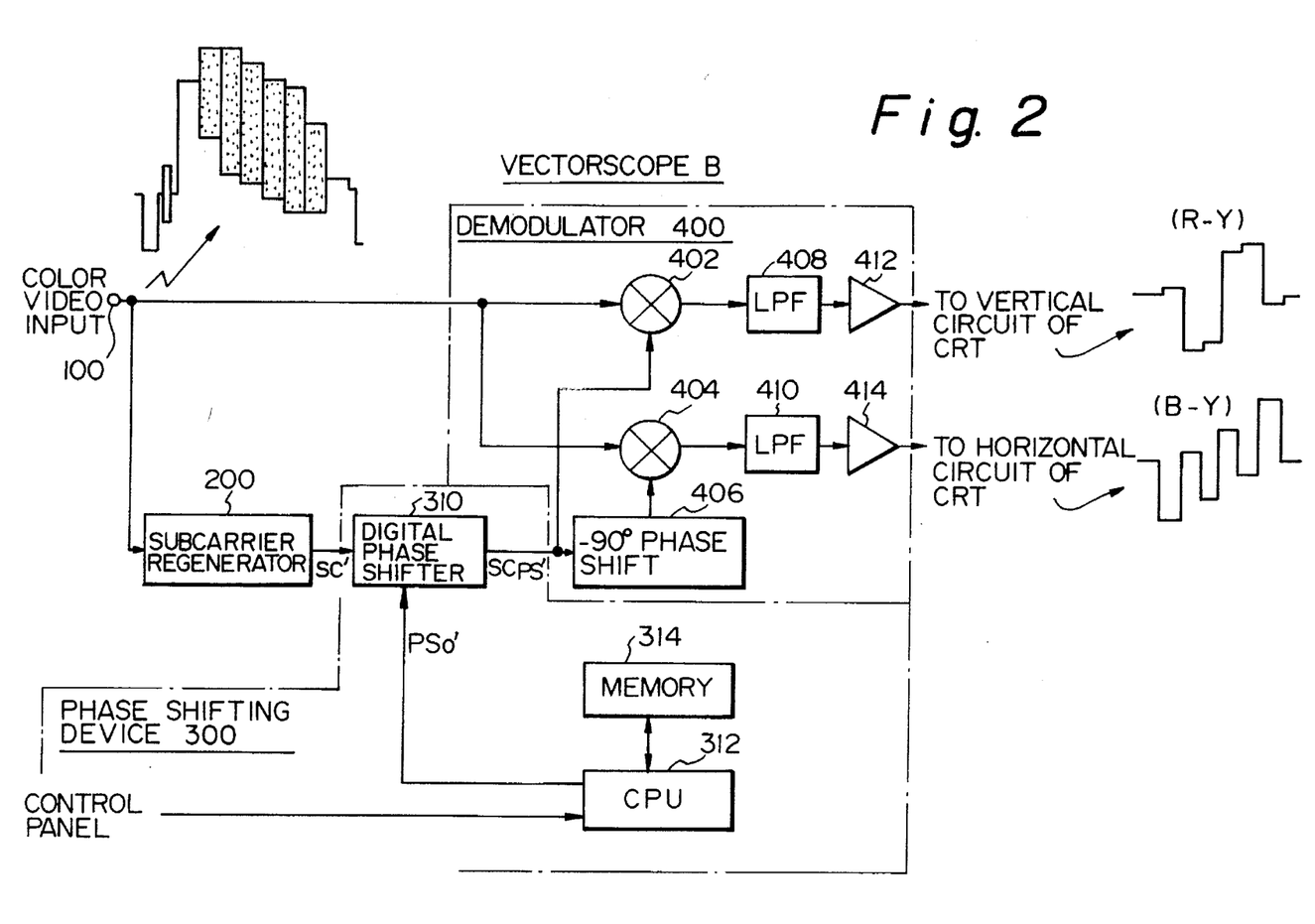
FIG. 2 is a block diagram of a vectorscope B which is a more specific embodiment of the vectorscope A shown in FIG. 1.

Referring first to FIG. 2, a block diagram of the vectorscope B is shown. Vectorscope B comprises an input terminal 100, a subcarrier regenerator 200, a phase shifting device 300 and a demodulator circuit 400, which correspond to the elements 10, 20, 30 and 40, respectively, shown in FIG. 1. It should be noted, however, that a display device corresponding to the CRT 50 in FIG. 1 is not shown in FIG. 2. As will be understood by those skilled in the art, the demodulator circuit 400 of the vectorscope B comprises a pair of multipliers 402 and 404, −90° phase shift circuit 406, a pair of low pass filters (LPFs) 408 and 410, and a pair of amplifiers 412 and 414. More specifically, the multiplier 402 multiplies an input color video signal (a standard color bar signal is illustrated in FIG. 2 as an example) from the input terminal 100 by a phase-shifted regenerated subcarrier $SC_{PS}'$ from the phase shifting device 300, and the result of the multiplication is outputted through the LPF 408 and the amplifier 412 as an R-Y signal (a waveform produced from the color bar signal is illustrated in FIG. 2). The output is applied to a vertical circuit of a CRT (not shown). The multiplier 404 multiplies the color video signal from the input terminal 100 by the phase-shifted subcarrier $SC_{PS}'$ which is further shifted in phase by −90 degrees via the circuit 406, and likewise the result is outputted through the LPF 410 and the amplifier 414 as a B-Y signal (a waveform produced from the color bar signal is illustrated in FIG. 2). The output is applied to a horizontal circuit of the CRT.

The phase shifting device 300 of this embodiment comprises a digital phase shifter 310 connected between the regenerator 200 and the phase shift circuit 406; a central processing unit (CPU) 312 adapted to receive inputs from a variety of knobs and keys on a control panel (shown in FIG. 3); and a memory 314 connected to the CPU 312. The CPU 312 includes an output connected to a phase shift control input of the shifter 310, and operates to generate a phase shift output signal $PS_O'$ at the output in accordance with a program which will be explained in connection with an operation flow chart. It should be noted that although the CPU 312 also performs other operations not related to the phase shifting device 300, such operations will not be explained here since they are not relevant to the present invention. The memory 314 is used to store the abovementioned program as well as a preset value $PS_P$ which corresponds to a predetermined amount of phase shifting mentioned in connection with FIG. 1.

Figure 3:
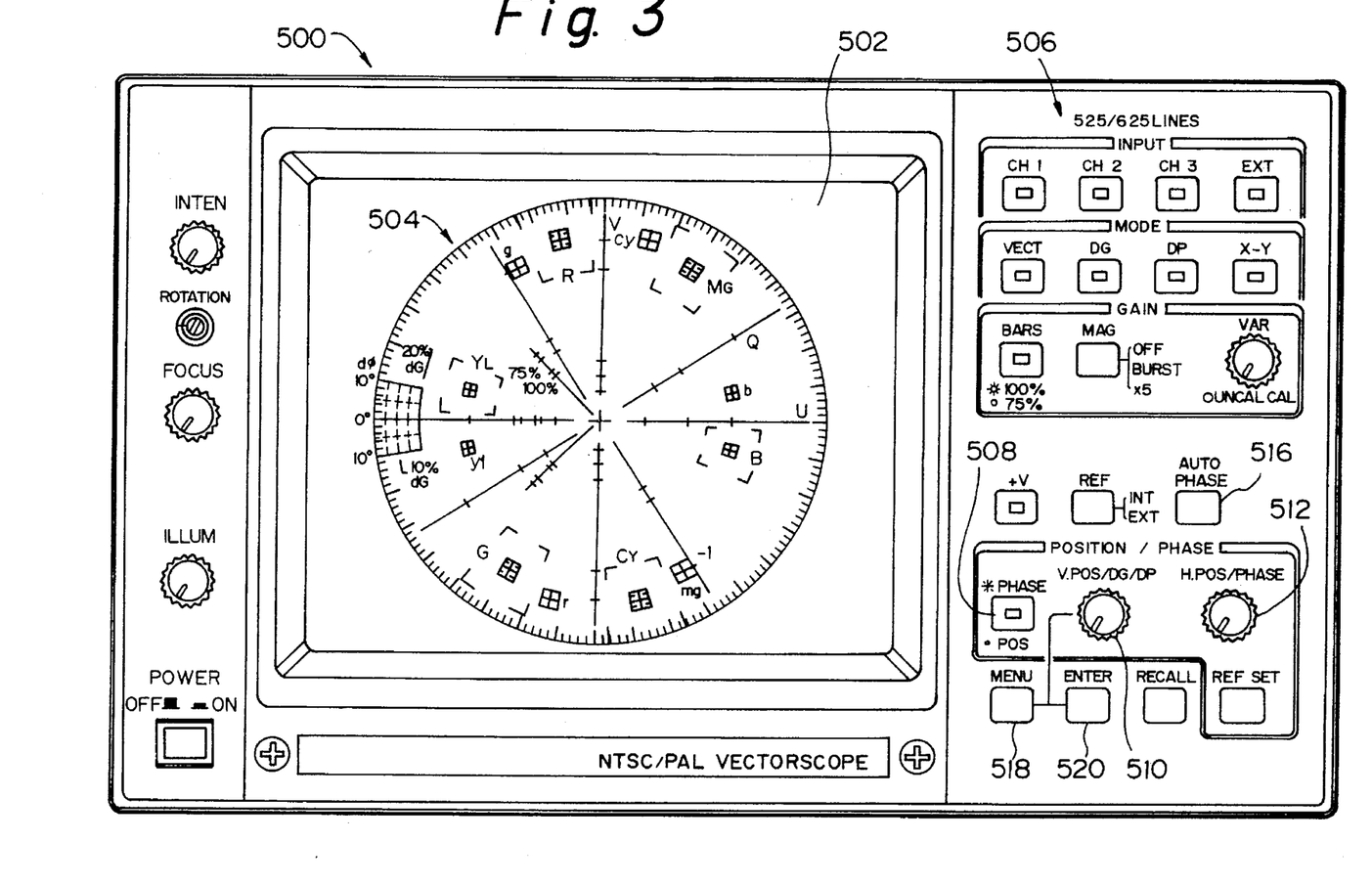
FIG. 3 is a diagram illustrating a front panel of the vectorscope B shown in FIG. 2.

FIG. 3 illustrates a front panel 500 of the vectorscope B shown in FIG. 2. As illustrated, the front panel 500 includes a display screen 502; a vector display graticule 504 (including graticules for NTSC and PAL) on the screen; and a control panel 506. While a variety of keys and knobs are arranged on the control panel 506, those related to the present invention include a group of POSITION/PHASE keys and knobs, i.e., a PHASE/POS (ITION) switching key 508; a V.POS/DG/DP knob 510 switchable by the key 508 (functioning as a vertical position (V.POS) knob with the key 508 switched to a POS position); and a H.POS/PHASE knob 512 likewise switchable by the key 508 (functioning as a phase shift (PHASE) knob with the key 508 switched to a PHASE position). The POSITION/PHASE key group also includes an AUTO PHASE key 516, a MENU key 518, and an ENTER key 520.

Figure 4:
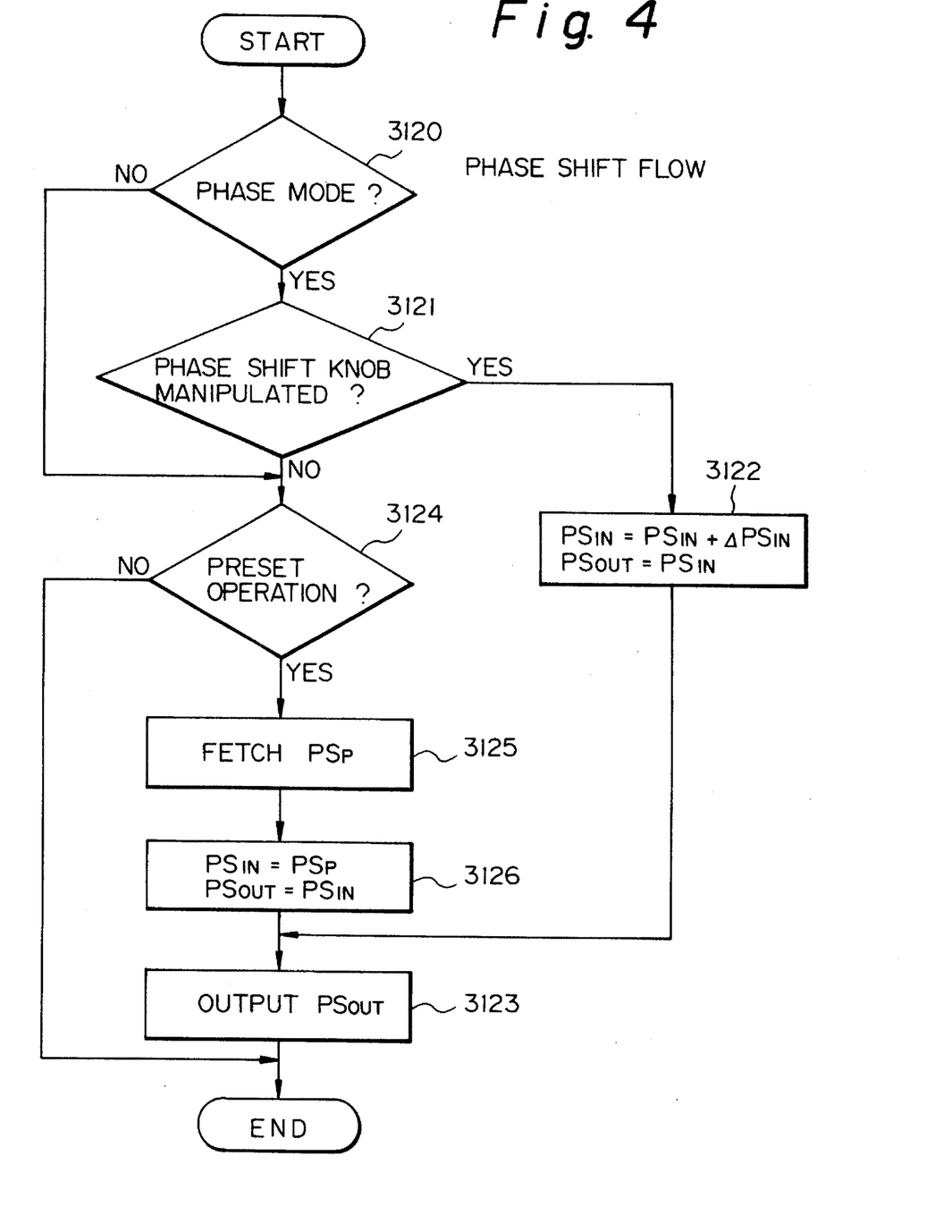
FIG. 4 is a flow chart representing a phase shift operation executed by CPU within the vectorscope B.
Figure 5:
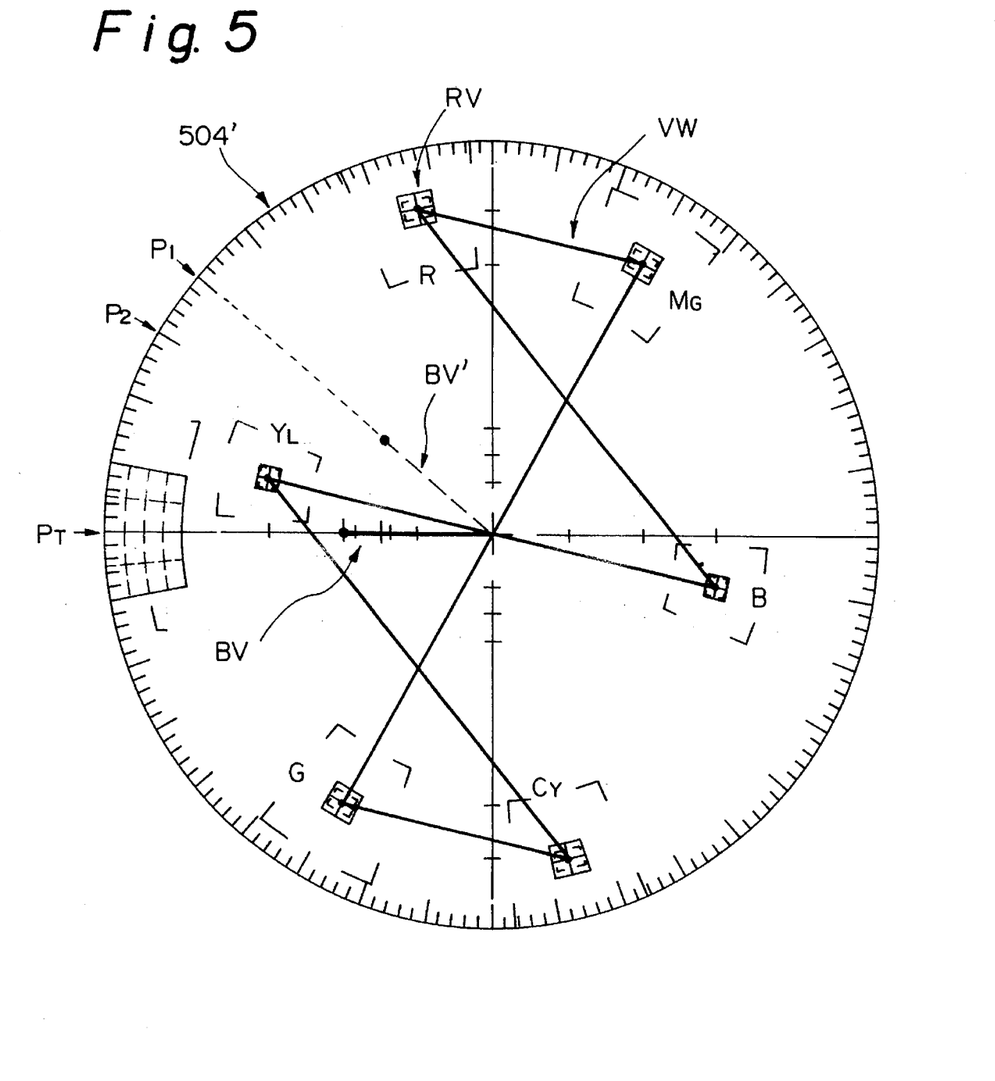
FIG. 5 shows a waveform appearing on a screen of the vectorscope B in FIG. 2, wherein a vector display graticule for the NTSC standard only (a part of the graticule being omitted for clarification) and a simplified vector-displayed waveform VW generated when a standard color bar signal is inputted are illustrated.

Now, referring to FIGS. 4 and 5, manipulations and associated operations for rotating a vector-displayed waveform on the vectorscope B will be described. FIG. 4 shows a flow chart representing a phase shifting operation, and FIG. 5 shows a display screen with a vector display graticule 504' for the NTSC standard (part of the graticule is omitted for clarification) and a simplified vector-displayed waveform VW displayed thereon when a standard color bar signal is inputted. Here, for the purpose of description, it is assumed that a waveform portion serving as a phase shifting reference is a burst signal vector BV, and a target phase position is a standard phase position of the burst signal vector, i.e., a position $P_T$ at 180 degrees. In this case, the phase shift preset value $PS_P$ stored in the memory 314 is typically equal to zero or a value close to zero.

The following explanation will proceed in connection with an exemplary operation of manually moving the burst vector BV to a phase position $P_1$ for the purpose of a certain measurement and returning the burst vector BV to the original position $P_T$ after the completion of the measurement. First, at the first step 3120 of the flow chart shown in FIG. 4, it is determined whether or not the key 508 is depressed to set the phase mode. The flow proceeds to the next step 3121 if the decision at step 3120 is YES, and to step 3124 if the decision is NO. In this example, since the key 508 is depressed to the PHASE position in order to perform a phase shift operation with the knob 512, the flow proceeds to step 3121, where it is determined whether or not the phase shift knob, i.e., knob 512 is manipulated. The flow proceeds to step 3122 if the decision at step 3121 is YES, and to step 3124 if the decision is NO. In this example, since the manual manipulation of the knob is performed, the flow proceeds to step 3122, where a phase shift displacement $\Delta PS_{IN}$ is added to a phase shift input $PS_{IN}$ (which is initially equal to a phase shift corresponding to the $P_T$ position, and therefore is substantially zero), and a phase shift output $PS_{OUT}$ is made equal to the resultant $PS_{IN}$. Next, at step 3123, $PS_{OUT}$ is outputted to the phase shifter 310 as $PS_O'$ to cause a phase shift operation to be performed, and then the flow is exited. If the burst vector BV has not reached the phase position $P_1$ after the first pass, for example, if the burst vector BV has been moved merely to a phase position $P_2$, the flow is repeated until the burst vector BV reaches the phase position $P_1$. Thus, steps 3120–3123 are executed a number of times. Repeating fine adjustments, the burst vector finally reaches the $P_1$ position and is displayed as a burst vector BV' (indicated by a broken line for distinguishing from the original burst vector BV). It should be noted that in FIG. 5, portions of the vector-displayed waveform other than the burst vector BV' are not illustrated for clarification. At this time, $PS_{IN}$ is substantially equal to −40 degrees. Then, the above-mentioned measurement is performed.

After the completion of the measurement, the burst vector BV' will be returned to the original position $P_T$. When the preset value $PS_P$ is used in this event, the flow starts from step 3120 or 3121 and proceeds to step 3124, where it is determined whether a preset operation is performed, i.e., if the AUTO PHASE key 516 is depressed. If NO, the flow is exited. If YES, steps 3125, 3126 and 3123 are executed. More specifically, the preset value $PS_P$ is fetched from the memory 314 (step 3125), and the phase shift input $PS_{IN}$ is made equal to $PS_P$ and also the phase shift output $PS_{OUT}$ is made equal to $PS_{IN}$ (step 3126). Next, $PS_{OUT}$ (=$PS_P$) thus obtained is outputted to the phase shifter 310 (step 3123). As a result, the vector-displayed waveform VW instantaneously returns to the rotational position where the burst vector BV is placed at the $P_T$ position. If the waveform VW is further rotated from the position by a manual manipulation, the above-mentioned manual manipulation and steps 3120–3123 may be performed.

While in the above described example, the burst vector BV is selected as a waveform portion serving as a phase shifting reference with the target phase position correspondingly determined to the position $P_T$ at 180 degrees, any other waveform portion may be selected as the phase shifting reference. For example, a red (R) vector RV, or either one of other green (G), blue (B), magenta (Mg), yellow ($Y_L$), and cyan ($C_Y$) vectors, or any waveform portion between them may be selected, and the phase position of the selected portion may be determined to be the target phase position. The selection may be made by a user in accordance with particular measurement purpose or manipulation purpose. Typically, it is convenient to select the burst vector.

Figure 6:
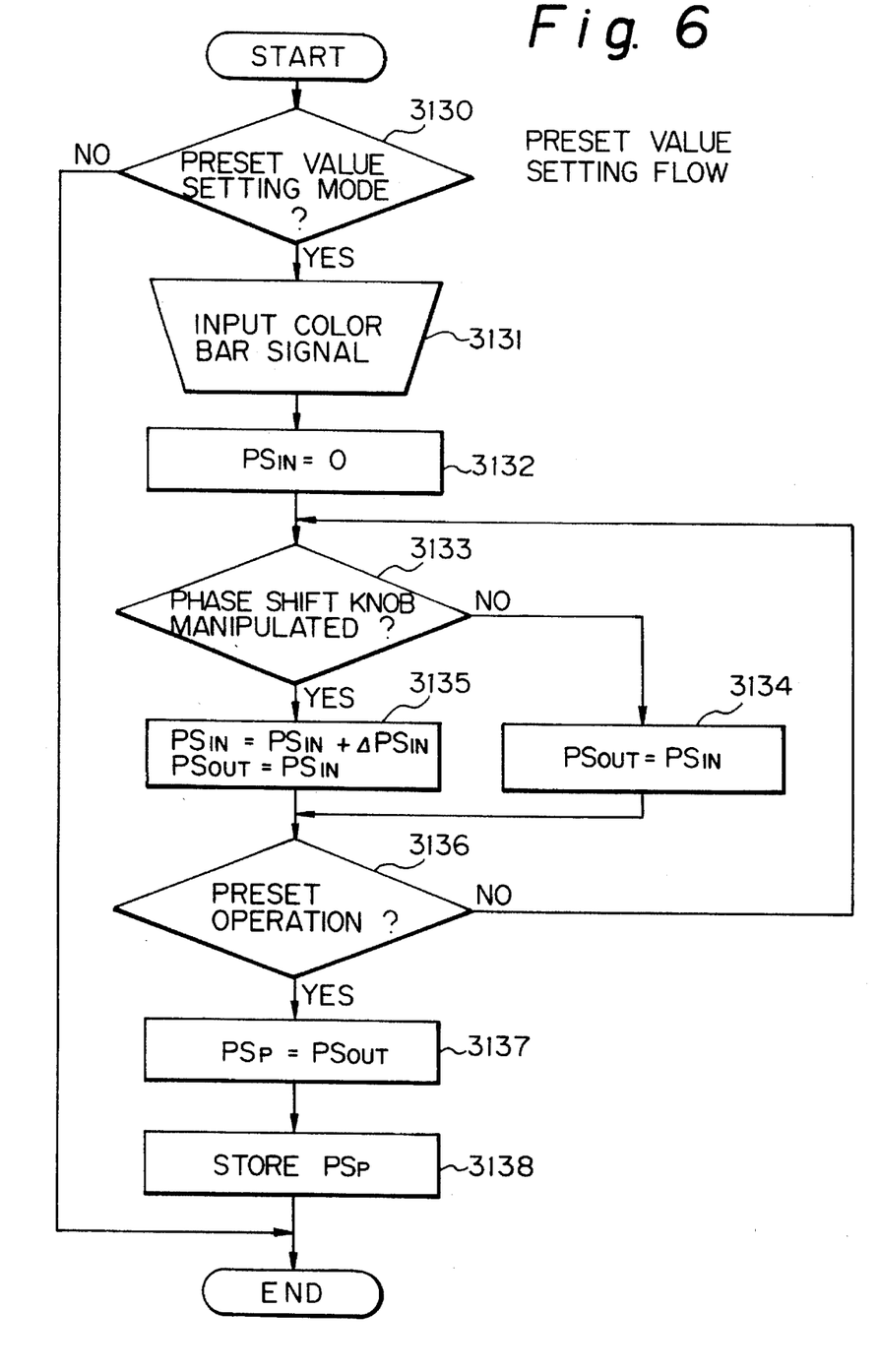
FIG. 6 is a flow chart representing a preset value setting operation executed by the CPU shown in FIG. 2.

Next, referring to a preset value setting flow shown in FIG. 6, a method of setting the preset value $PS_P$ will be described. In the following description, it is assumed that a waveform portion to be selected is a burst vector, and that a target phase position is changed from the position $P_T$ to the position $P_1$. First, at step 3130 in FIG. 6, it is determined whether a preset value setting mode is selected. For setting this mode, the MENU key 518 and another predetermined key on the control panel 506 are simultaneously depressed to cause a special menu to be displayed on the screen. The displayed menu includes the following within a plurality of items:

POS/PH

POS

NTSC PHASE

PAL PHASE.

The preset value setting mode is set when the user places a displayed cursor on "NTSC PHASE"(or on "PAL PHASE" when the PAL standard is used) by manipulating a vertical position knob 510 and depresses the ENTER key 520. If this mode is not selected, the flow is exited. If the decision at step 3130 is YES, the flow proceeds to steps 3131–3138. More specifically, a standard color bar signal is inputted to the vectorscope by the user (step 3131), a phase shift input $PS_{IN}$ is made equal to zero (step 3132), and then it is determined at step 3133 whether the phase shift knob 512 is manipulated. If the decision at step 3133 is NO, for example, when a change of the preset value is canceled or before the manipulation for changing the preset value is initiated, the flow proceeds to step 3134 where $PS_{OUT}$ is set equal to $PS_{IN}$, followed by the flow proceeding to step 136. If YES at step 3133, a phase shift displacement $\Delta PS_{IN}$ is added to $PS_{IN}$ with $PS_{OUT}$ being set equal to the resultant $PS_{IN}$, at step 3135. Thereafter, the flow proceeds to step 3136 where it is determined whether the preset operation is selected, i.e., the ENTER key 520 is depressed. In this example, a loop from step 3136 to step 3133 is repeated until the burst vector BV is moved to the position $P_1$. Then, if the user depresses the ENTER key 520, the decision at step 3136 is affirmative, causing the flow to proceed to step 3137 where the preset value $PS_P$ is made equal to $PS_{OUT}$. The changed preset value $PS_P$ is stored in the memory 314 at step 3138, resulting in completing the preset value setting operation.

It will be appreciated from the foregoing that the preset value can be readily changed as described above. This in turn enables the combination of a waveform portion selected as a phase shift reference and a target phase position to be arbitrarily changed. Thus, the preset value may be adjusted in relation to a particular combination of a selected waveform portion and a target phase position, or the preset value may be changed for another combination of a selected waveform portion and a target phase position, in accordance with variations with time in the circuit characteristics of a vectorscope, or in accordance with the characteristics or quality of a video signal under measurement.

While the foregoing embodiment of the present invention has been described in connection with the NTSC standard, the present invention may be applied likewise to the PAL standard since the phase shifting device of the present invention does not depend on the shape of a vector-displayed waveform.

It will be appreciated from the foregoing detailed description that the present invention, with its capability of instantaneously and discontinuously changing an amount of phase shifting, can rapidly rotate a vector-displayed waveform. Also, since a preset value is used, the waveform can be accurately moved to the same target phase position with a good reproductivity. Further, since any portion of a vector-displayed waveform can be selected and also any target phase position can be selected, phase shift operations can be performed in a more convenient way. Furthermore, since the present invention does not need circuits such as a sample and hold circuit and a zero adjust circuit, which have been required in a conventional phase shifter, a phase shifting device can be realized with a simple configuration.

What is claimed is:

1. A phase shifting device for shifting in phase a subcarrier regenerated from a video signal inputted to a vectorscope by a specified amount to control the phase of a vector-displayed waveform displayed on said vectorscope, comprising:

a) phase shifting means having an input for receiving said regenerated subcarrier, an input for receiving a phase shift output signal, and an output for providing said regenerated subcarrier having a phase shifted by an amount represented by said phase shift output signal;

b) first phase shift input generator means for producing a first phase shift input signal representative of an arbitrary amount of phase shifting;

c) second phase shift input generator means for producing a second phase shift input signal representative of a predetermined amount of phase shifting;

d) phase shift input selection command means for producing an input selection command signal for selecting one of said first and second phase shift input signals; and e) phase shift output generator means connected to said first and second phase shift input generator means and to said phase shift input selection command means for selecting one of said first and second phase shift input signals in response to said input selection command signal and for providing the selected one as said phase shift output signal.

2. A phase shifting device according to claim 1, wherein said second phase shift input generator means includes:

a) storage command means for producing a storage command signal; and b) storing means for storing said phase shift output signal as said second phase shift input signal in response to said storage command signal.

3. A phase shifting device according to claim 1 or 2, wherein said first phase shift input generator means includes:

a) displacement input means for providing a phase shift displacement; and b) changing means connected to said displacement input means and to said phase shift output generator means for combining said phase shift output signal with said phase shift displacement to generate said first phase shift input signal.

4. A phase shifting device according to claim 1 or 2, wherein said second phase shift input generator means is used to shift in phase said vector-displayed waveform so as to cause a predetermined waveform portion in said vector-displayed waveform to be located at a predetermined target phase position.

5. A phase shifting device according to claim 4, wherein said waveform portion is a burst signal vector, and wherein said target phase position is a standard phase position of the burst signal vector.

6. A phase shifting device including phase shift means for controlling the phase of an entire vector-displayed waveform displayed on a vectorscope, characterized by including:

predetermined phase shift input generator means for producing a predetermined phase shift input signal representative of a predetermined amount of phase shifting for application to said phase shift means.

7. A phase shifting device according to claim 6, further comprising arbitrary phase shift input generator means for producing an arbitrary phase shift input signal representative of an arbitrary amount of phase shifting for application to said phase shift means.

8. A phase shifting device according to claim 7, further comprising:

a) phase shift input selection command means for producing an input selection command signal for selecting one of said predetermined phase shift input signal and said arbitrary phase shift input signal; and b) phase shift output generator means connected to said predetermined phase shift input generator means, said arbitrary phase shift input generator means and said phase shift input selection command means for selecting one of said predetermined phase shift input signal and said arbitrary phase shift input signal in response to said input selection command signal and for providing the selected one to said phase shift means as a phase shift output signal.

9. A phase shifting device according to claim 8, wherein said predetermined phase shift input generator means includes:

a) storage command means for producing a storage command signal; and b) storing means for storing said phase shift output signal as said predetermined phase shift input signal in response to said storage command signal.

10. A phase shifting device according to claim 8 or 9, wherein said arbitrary phase shift input generator means includes:

a) displacement input means for providing a phase shift displacement; and b) changing means connected to said displacement input means and to said phase shift output generator means for combining said phase shift output signal with said phase shift displacement to generate said arbitrary phase shift input signal.

11. A vectorscope comprising:

A. an input terminal for receiving a color video signal;

B. a subcarrier regenerator having an input connected to said input terminal and an output for providing a regenerated subcarrier;

C. a phase shifting device having an input coupled to the output of said subcarrier regenerator, said device being operative to shift in phase said regenerated subcarrier by a specified amount, said phase shifting device including:

a) phase shifting means having an input for receiving said regenerated subcarrier, an input for receiving a phase shift output signal, and an output for providing said regenerated subcarrier having a phase shifted by an amount represented by said phase shift output signal;

b) first phase shift input generator means for producing a first phase shift input signal representative of an arbitrary amount of phase shifting;

c) second phase shift input generator means for producing a second phase shift input signal representative of a predetermined amount of phase shifting;

d) phase shift input selection command means for producing an input selection command signal for selecting one of said first and second phase shift input signals; and e) phase shift output generator means connected to said first and second phase shift input generator means and to said phase shift input selection command means for selecting one of said first and second phase shift input signals in response to said input selection command signal and for providing the selected one as said phase shift output signal;

D. a demodulator circuit having a first input connected to said input terminal and a second input connected to an output of said phase shifting device, said demodulator circuit being operative to produce R-Y and B-Y signals; and E. a display coupled to receive said R-Y and B-Y signals.

* * * * *